United States Patent [19]
Abali

[11] Patent Number: 6,065,063
[45] Date of Patent: May 16, 2000

[54] DEADLOCK AVOIDANCE METHOD IN A COMPUTER NETWORK

[75] Inventor: Bulent Abali, New York, N.Y.

[73] Assignee: International Business Machines Corp., Armonk, N.Y.

[21] Appl. No.: 09/015,593

[22] Filed: Jan. 29, 1998

[51] Int. Cl.[7] ........................................... G06F 11/00
[52] U.S. Cl. ..................... 709/242; 709/224; 712/25
[58] Field of Search ................................ 709/242, 224; 395/500.03; 712/25; 370/351, 406, 408, 254, 427

[56] References Cited

U.S. PATENT DOCUMENTS

| | | | |
|---|---|---|---|
| 4,912,656 | 3/1990 | Cain et al. | 709/242 |
| 5,021,947 | 6/1991 | Campbell | 712/25 |
| 5,453,978 | 9/1995 | Sethu et al. | 370/254 |
| 5,533,016 | 7/1996 | Cook et al. | 370/351 |
| 5,587,922 | 12/1996 | Hendrickson et al. | 395/500.03 |
| 5,748,844 | 5/1998 | Marks | 706/45 |

OTHER PUBLICATIONS

Robert Horst, "ServerNet Deadlock Avoidance and Fractahedral Topologies", Proc. 10th Int. Parallel Processing Symp. (IPPS '96), pp. 274–280, Apr. 1996.

T.H. Cormen, "Introduction to Algorithms", NY: McGraw–Hill, pp. 465–485, 1990.

Wenjian Qiao et al., "Adaptive Routing in Irregular Networks Using Cut–Through Switches*", Int. Parallel Processing Symp. (IPPS '96), pp. 1–10.

*Primary Examiner*—Zarni Maung
*Assistant Examiner*—Khanh Dinh
*Attorney, Agent, or Firm*—F. Chau & Associates, LLP

[57] ABSTRACT

In an apparatus having a network including successive stages of cross-point switches which collectively interconnect a plurality of nodes external to said network, wherein at least one message is carried between one of the nodes and one of the cross-point switches over a route through said network, a method for preventing routing deadlocks from occurring in the network which comprises the steps of: creating a graphical representation of the network; searching for the existence of cycles within the graphical representation; partitioning the graphical representation into at a first subgraph and a second subgraph if cycles exist in the graphical representation; searching for the existence of edges directed from the first subgraph to the second subgraph; and removing the edges directed from the first subgraph to the second subgraph. Preferably the step of partitioning the network into at a first subgraph and a second subgraph is performed such that the first subgraph and the second subgraph have an equal number of vertices, a number of directed edges from the first subgraph to the second subgraph is minimized so as to minimize the number of routes prohibited, and a set of partition constraints are satisfied. The method is recursively applied to the first subgraph and then the second subgraph, thereby removing all of the deadlock prone cycles in the network while minimizing the number of routes prohibited due to remove edges.

23 Claims, 12 Drawing Sheets

DEADLOCK AVOIDANCE METHOD IN A COMPUTER NETWORK

BACKGROUND OF THE INVENTION

1. Field of the Invention

The present invention relates to methods for deadlock free routing of messages in a network of cross-point switches. More specifically, the present invention is particularly useful in a parallel computer system consisting of a large number of processors interconnected by a network of cross-point switches.

2. Description of the Related Art

With the continual evolution and commercial availability of increasingly powerful, sophisticated and relatively inexpensive microprocessors, massively parallel processing appears as an increasingly attractive vehicle for handling a wide spectrum of applications, such as, e.g., involving transaction processing, simulation and structural analysis, heretofore processed through conventional mainframe computers.

In a massively parallel processing system, a relatively large number, often in the hundreds or even thousands, of separate, though relatively simple, microprocessor based processing elements is inter-connected through a communications fabric generally formed of a high speed packet network in which each such processing element appears as a separate port on the network. The fabric routes messages, in the form of packets, from any one of these processing elements to any other to provide communication therebetween. Each of these processing elements typically contains a separate microprocessor and its associated support circuitry, the latter being typified by, inter alia, random access memory (RAM) and read only memory (ROM), for temporary and permanent storage, respectively, and input/output (I/O) circuitry. In addition, such processing element also contains a communication sub-system, formed of an appropriate communications interface and other hardware as well as controlling software, that collectively serves to interface that element to the packet network.

Generally, the overall performance of massively parallel processing systems is heavily constrained by the performance of the underlying packet network used therein. In that regard, if the packet network is too slow and particularly to the point of adversely affecting overall system throughput, the resulting degradation may sharply and disadvantageously reduce the attractiveness of using a massively parallel processing system in a given application.

Specifically, in a massively parallel processing system, each processing element executes a pre-defined granular portion of an application. In executing its corresponding application portion, each element generally requires data from, e.g., an application portion executing on a different element and supplies resulting processed data to, e.g., another application portion executing on yet another processing element. Owing to the interdependent nature of the processing among all the elements, each processing element must be able to transfer data to another such element as required by the application portions then executing at each of these elements. Generally, if the processing element, i.e., a "destination" element, requests data from another such element, i.e., a "source" or "originating" element, the destination element remains idle, at least for this particular application portion, until that element receives a packet(s) containing the needed data transmitted by the source element, at which point the destination element once again commences processing this application portion. Not surprisingly, a finite amount of time is required to transport, through the packet network, a packet containing the request from the destination to the source processing elements and, in an opposite direction, a responding packet(s) containing the requested data. This time unavoidably injects a degree of latency into that application portion executing at the destination element. Since most processing elements in the system function as destination elements for application portions executing at corresponding source elements, then, if this communication induced latency is too long, system throughput may noticeably diminish. This, in turn, will significantly and disadvantageously degrade overall system performance. To avoid this, the packet network needs to transport each packet between any two communicating processing elements as quickly as possible in order to reduce this latency. Moreover, given the substantial number of processing elements that is generally used within a typical massively parallel processing system and the concomitant need for any one element in this system to communicate at any one time with any other such element, the network must be able to simultaneously route a relatively large number, i.e., an anticipated peak load, of packets among the processing elements.

Although widely varying forms of packet networks currently exist in the art, one common architecture uses a multi-stage inter-connected arrangement of relatively small cross-point switches, with each switch typically being an 8-port bi-directional router in which all the ports are internally inter-connected through a cross-point matrix.

For example, FIG. 1 illustrates a switch board 100 typically used in current parallel processing systems. Current parallel processing systems comprise up to 512 nodes and at least one switch board interconnecting the processors. Switch board 100 includes eight cross-point switches $102_0$–$102_7$. Preferably the eight cross-point switches $102_0$–$102_7$ are configured to be four-by-four bidirectional cross-point switches having four internal and four external bidirectional ports $106_0$–$106_7$. Internal ports are designated with numerals four, five, six and seven. External ports are designated with numerals zero, one, two and three. Each link 104 interconnecting a pair of cross-point switches $102_0$–$102_7$, is preferably a full duplex bidirectional link, allowing simultaneous message transmission in both directions, i.e., to and from each cross-point switch 102. The aggregate of links 104 form a connection matrix 105. The eight cross-point switches $102_0$–$102_7$ and the connection matrix 105 collectively comprise a single switch board.

Bidirectional multistage networks such as SP2 networks allow messages to turn from cross-point switches where a message entering a switch chip from one side may turn around and leave the switch from the same side, as shown in FIG. 1. In such networks, there is a possibility of a deadlock since the head and tail of messages may span several switch chips. For example, it is possible that four messages, each represented by an arrow, enter the switch board simultaneously as shown in FIG. 1. The head of each message wants to turn around from a particular switch chip, however, finding its intended destination blocked by another message. No message will retreat, rather, each will wait for the others to clear the intended path. The result will be a deadlock, in which the four messages will wait forever.

The deadlock in FIG. 1, in graph theoretic terms, is a cycle of directed edges where no outgoing edge in the cycle exists. A cycle is a contiguous sequence of input and output ports in the network, where the first and the last ports are the same port. Deadlocks may be avoided by preventing cycles from forming in the network.

The presence of cycles in the network may be detected by the well known depth-first search algorithm. When utilizing this technique, the network is represented by a graph where graph vertices represent the switch input and output ports and graph edges represent the links between pairs of switch ports and possible connections between ports within the switches. Starting with any switch port, and then exhaustively searching the entire network in depth-first fashion, a cycle will be detected, if any exist, wherein the first port is the same as the last port.

FIG. 2 illustrates a 512 processor system having node switch boards $108_0$–$108_{31}$ and intermediate switch boards $114_0$–$114_{15}$. Node switch boards $108_0$–$108_{31}$ comprise electrical structure to connect to sixteen processors or nodes on an external side 110 of the node switch boards $108_0$–$108_{31}$ and similar electrical structure to connect to other switch boards on an internal side 112. Processors are commonly also referred to as nodes. Intermediate switch boards $114_0$–$114_{15}$ are generally found on large parallel processing systems such as the systems shown in FIG. 2. Intermediate switch boards $114_0$–$114_{15}$ are named as such since they do not directly connect to processors, rather they are configured to interconnect a plurality of node switch boards. Intermediate switch boards $114_0$–$114_{15}$ are each shown having electrical structure to connect to a maximum of sixteen node switch boards on a first side 115 and a maximum of sixteen node switch boards on a second side 117. Links 104 interconnect the node switch boards $108_0$–$108_{31}$ with intermediate switch boards $114_0$–$114_{15}$. FIG. 2, therefore, illustrates a 512 node system that comprises thirty-two node switch boards $108_0$–$108_{31}$, also designated as NSB0 through NSB31, and sixteen intermediate switch boards $114_0$–$114_{15}$, also designated as ISB0 through ISB15. The quantity of nodes a system is capable of accommodating is determined by multiplying the number of node switch boards $108_0$–$108_3$, by the number of ports 106 on the external sides 110 of each node switch board. In the embodiment shown in FIG. 2, the thirty two node switch boards $108_0$–$108_{31}$, each having sixteen external ports 106, define a (32×16=512) 512 node system.

While such a bidirectional multi-stage packet-switched network is relatively simple, as compared to other packet-switched network topologies, and offers high transmission bandwidth among all its ports, unfortunately this type of network is susceptible to routing deadlocks. As a result, when a deadlock occurs, the processing elements, to which packets are destined, continue to wait for the packets which, in turn, halts their processing throughput. Consequently, the bandwidth of the network skews to favor only those remaining processing elements unaffected by the deadlock which, in turn, can severely imbalance the processing workload and significantly diminish system throughput.

In FIG. 3, a typical highway example is utilized to illustrate the concept of a deadlock, by analogy. A highway is shown with one lane in either of the northbound and southbound directions, wherein a northbound vehicle 124 wants to make a left turn onto side street 125 and is required to wait for the southbound lane of traffic to clear, thereby causing all northbound traffic behind vehicle 124 to stop. Likewise, a southbound vehicle 126 wants to make a left turn onto side street 127 and is required to wait for the northbound lane of traffic to clear, thereby causing all southbound traffic behind vehicle 126 to stop. Now, since both lanes are blocked, neither of the two vehicles can make a left turn. The net result is a deadlock condition wherein all traffic comes to a stop and no vehicle can move forward. The deadlock condition may have been prevented here by a routing restriction, e.g., a "NO LEFT TURN" sign in at least one of the intersections. If the NO LEFT TURN sign existed, then either vehicle 124 or 126 would not have stopped. Therefore, eventually, either the northbound or southbound traffic would clear and allow the other lane to proceed.

Faced with the problem of avoiding deadlocks, one skilled in the art might first think that some type of global arbitration technique could be used to anticipate a routing deadlock and, in the event, one is expected to select one of a number of non-deadlockable paths over which a packet can be transmitted and thus avoid the deadlock. This technique would require that all switches be monitored to detect a potential routing deadlock and then arbitrated accordingly. Unfortunately, the circuitry to accomplish these functions would likely be quite complex and would also need to be located external to all the switch circuits but connected to each of them. This, in turn, increases the size, complexity and hence cost of the packet-switched network. As such, this technique would be quite impractical.

Given this, one might then turn to an alternate technique that involves forming the packet network with duplicated switch boards. By isolating packets that only flow in one switch board from potentially interacting with packets that simultaneously flow only in the other switch board, this technique does eliminate deadlocks. Furthermore, this technique does not degrade transmission bandwidth. Unfortunately, by requiring duplicate switch boards and associated circuitry, this technique is costly.

Finally, one might consider use of a technique that avoids routing deadlocks by simply prohibiting certain routes from being used. Through this particular technique, only a specific sub-set of all the routes between two switch chips in the same stage would be defined as being available to carry packet traffic therebetween and thus included within the route tables. The routes that form the sub-set would be specifically chosen such that routing deadlocks would not occur. Inasmuch as network bandwidth degrades as each additional route is prohibited, a goal in using this technique is to prohibit as few routes as possible.

Since the technique of prohibiting routes merely requires selecting certain entries to include in the route table for each processing element, this technique is very simple and highly cost-effective to implement. Thus, this technique would be readily favored for inclusion in a multi-stage cross-point packet network.

In a variation of the above routing schemes, U.S. Pat. No. 5,453,978 to Sethu et al. discloses a method of establishing deadlock-free routing of data messages in a parallel processing system. However, the technique disclosed in the '978 patent does not attempt to minimize the number of prohibited routes and effectively eliminates fifty percent of the internal bandwidth of an intermediate switch board.

Thus, a need exists in the art for a practical technique that prevents deadlocks from occurring in a large scale bidirectional multi-stage inter-connected cross-point switching network, and particularly, though not exclusively, for use in large scale massively parallel processing systems. A further need exists for such a technique which prevents deadlocks while minimizing the loss of bandwidth within the network.

SUMMARY OF THE INVENTION

The presently disclosed methods overcome these and other disadvantages of the prior art. In a network including successive stages of cross-point switches which collectively interconnect a plurality of nodes external to the network, wherein at least one service message is carried between one of the nodes and one of the cross-point switches over a route through the network, an object of the present invention is to provide a method for substantially preventing routing deadlocks from occurring in the network. The method includes the steps of creating a graphical representation of the network; searching for the existence of cycles within the graphical representation; partitioning the graphical representation into a first subgraph and a second subgraph if cycles exist in the graphical representation; searching for the existence of edges directed from the first subgraph to the second subgraph; and removing the edges directed from the first subgraph to the second subgraph.

In a preferred embodiment of the present invention, the step of partitioning the network into at a first subgraph and a second subgraph is performed such that the first subgraph and the second subgraph have an equal number of vertices, a number of directed edges from the first subgraph to the second subgraph is minimized so that as few routes as possible are prohibited, and a set of partition constraints are satisfied.

The method in accordance with the present invention is advantageously used in large parallel processing systems wherein each of the nodes includes a separate processing element. The method in accordance with the present invention may be used in a parallel processing system comprising about 512 separate processing elements and switches which are organized into about 32-port switchboards. The system may further comprise a plurality of switchboards wherein about 32 of the switchboards are node switchboards and about 16 of the switchboards are intermediate switchboards, wherein the intermediate switchboards collectively interconnect all of the node switchboards such that a corresponding one of about 16 ports on each of the node switchboards is connected, through a different corresponding link, to the same corresponding port on each one of the node switchboards and the remaining about 16 ports on each of the node switchboards are connected to about 16 different successive ones of the processing elements. The method may also be advantageously used in any computer network in which deadlocks may occur.

These and other objects, features and advantages of the present invention will become apparent from the following detailed description of illustrative embodiments, which is to be read in connection with the accompanying drawings.

BRIEF DESCRIPTION OF THE DRAWINGS

For a better understanding of the invention, reference is made to the following description of exemplary embodiments thereof, and to the accompanying drawings, wherein.

DETAILED DESCRIPTION OF PREFERRED EMBODIMENTS

Figure 1:
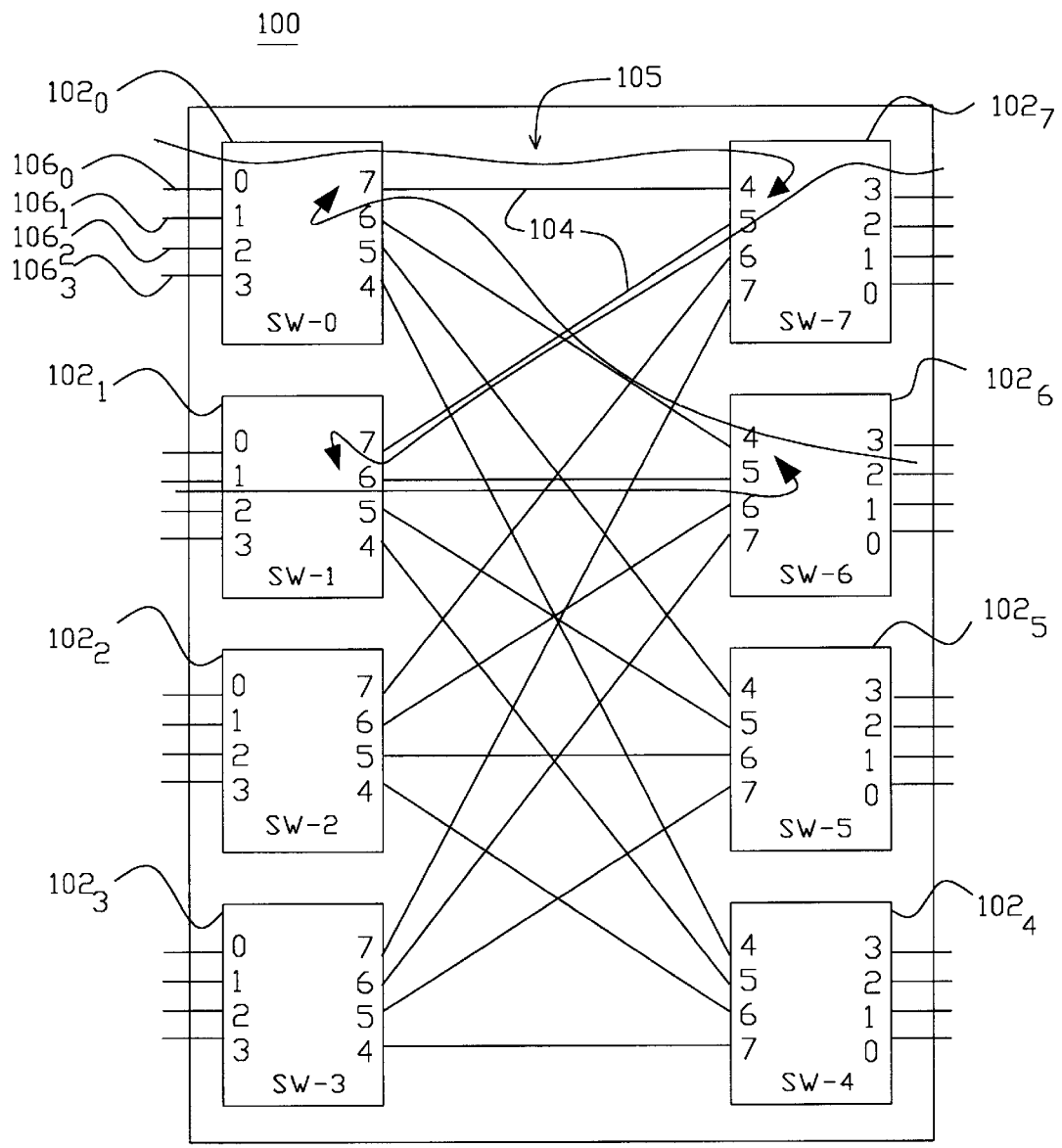
FIG. 1 is a schematic representation of a conventional switch board topology.
Figure 2:
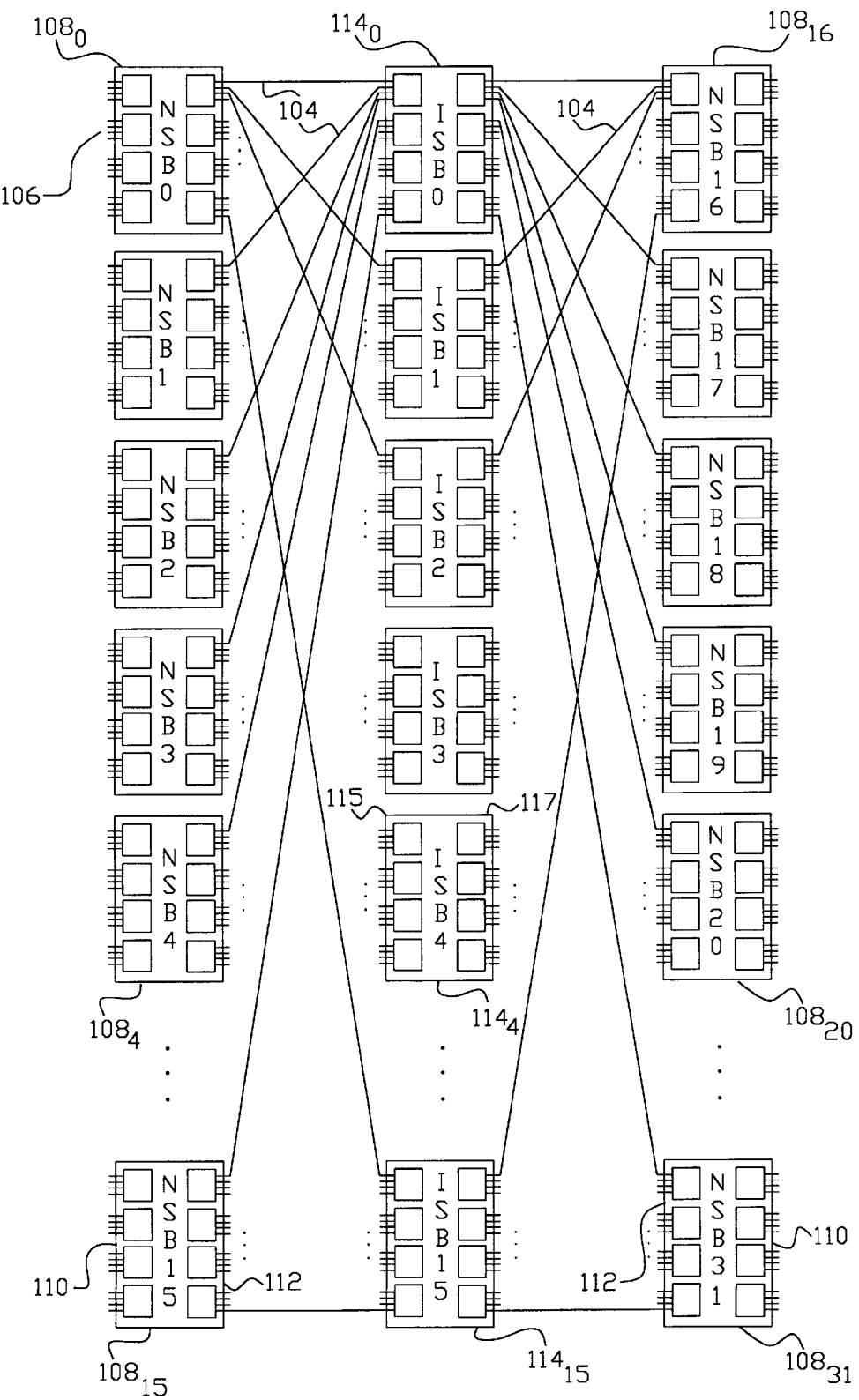
FIG. 2 is a block diagram of a conventional 512 processor node network.
Figure 3:
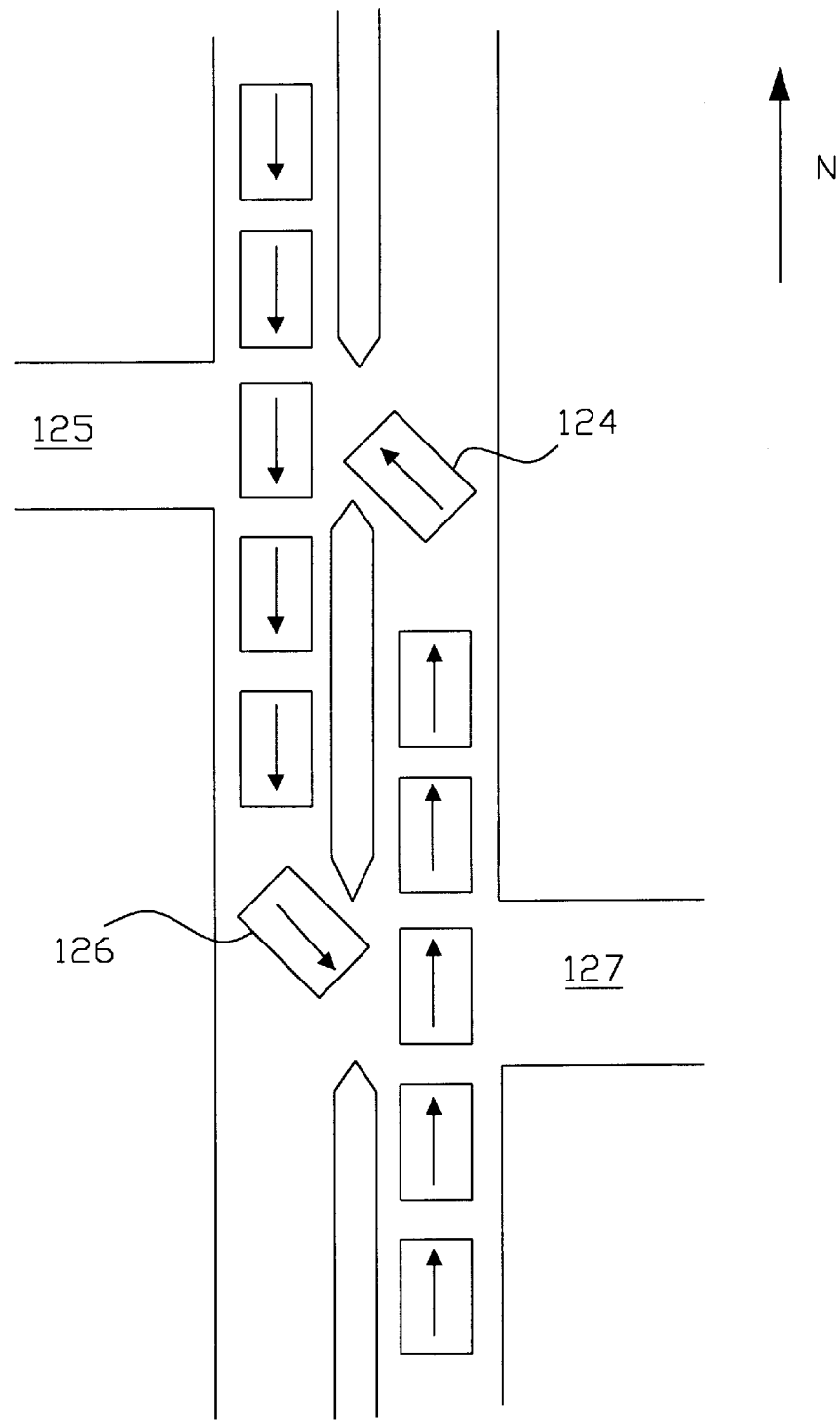
FIG. 3 is a block diagram illustrating a deadlock of data messages by analogy.

Referring now to the drawings in detail, and initially to FIGS. 4–7, a method for deadlock avoidance in a computer network in accordance with the present invention will be described. In general, the new method reveals all potential turn restrictions within the network by forming a graphic model of the network and recursively partitioning the model. At each stage of the partitioning, cross-partition arcs are removed to eliminate cycles which cause deadlocks.

To begin, a directed graphical representation G (V, E) of the network is ascertained using methods known to one having ordinary skill in the art, wherein graph vertices V (G) represent the network links and directed arcs E (G) represent possible input-output connections within the switch chips.

Figure 4:
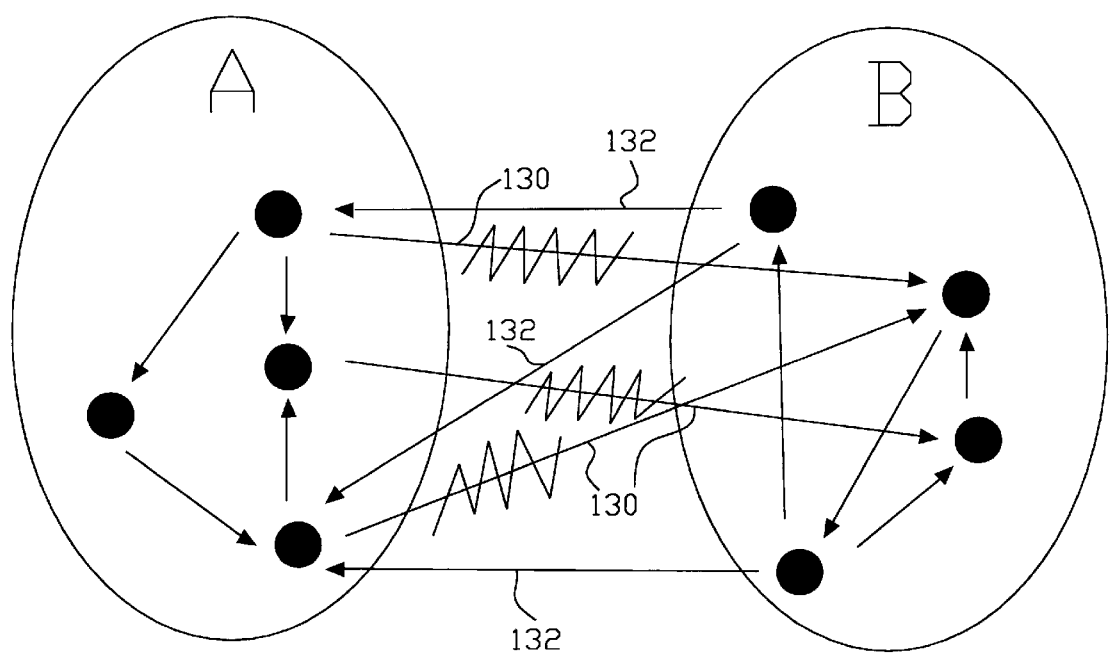
FIG. 4 is a schematic representation illustrating vertices of a graph partitioned in two sets A and B.

In accordance with the method of the present invention, the graph is initially partitioned into two sets of vertices A and B as illustrated in FIG. 4. Using graph partitioning algorithms known to one having ordinary skill in the art, the partition is made such that the number of arcs going from the first set of vertices A to the second set of vertices B is minimized. This minimization will result in as few routes prohibited as possible between the two sets. As partitioned, three arcs 130 traverse the sets in the direction from set A to set B, and three arcs 132 traverse the sets in the direction from set B to set A. The arcs 130 which traverse the sets in the direction of set A to set B are subsequently removed. These arcs represent turn restrictions within the network and are indicated in FIG. 4 by hatch marks across arcs 130.

Figure 5:
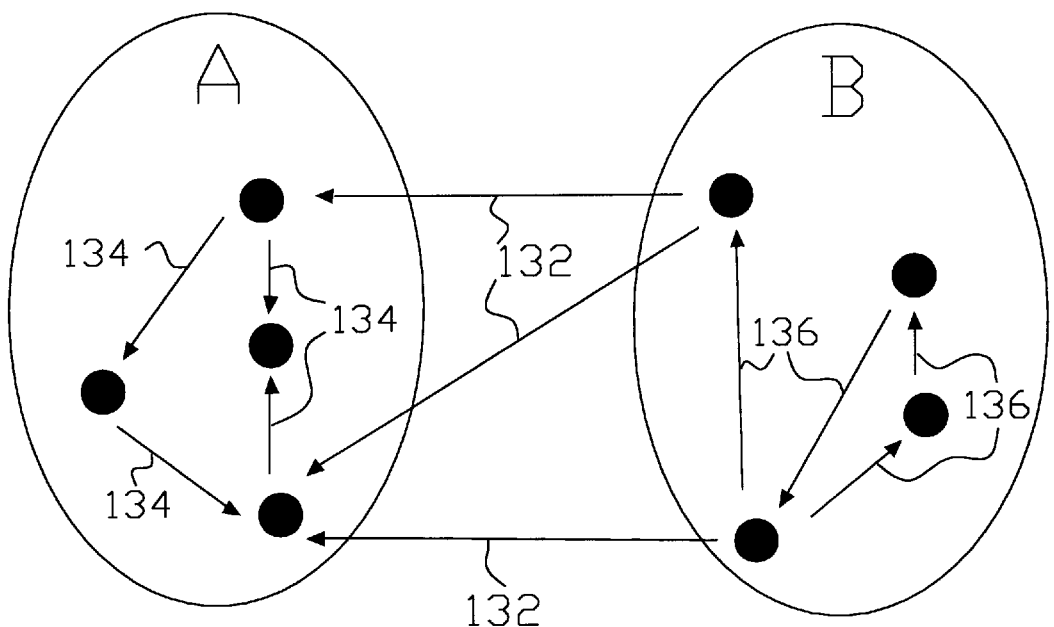
FIG. 5 is a schematic representation of the sets A and B of FIG. 4 with no cycles spanning the sets.

Referring now to FIG. 5, first and second sets of vertices A and B are illustrated with the arcs 130, which were marked for deletion in FIG. 4, removed. As illustrated in FIG. 5, since the remaining arcs which traverse first set A and second set B extend in a single direction (i.e., from set B toward set A) there cannot be a deadlock cycle spanning the two sets. The remainder of the arcs, designated by numerals 134 and 136 in sets A and B respectively, are wholly within the respective sets and therefore will not create a cycle between the two sets.

Figure 6:
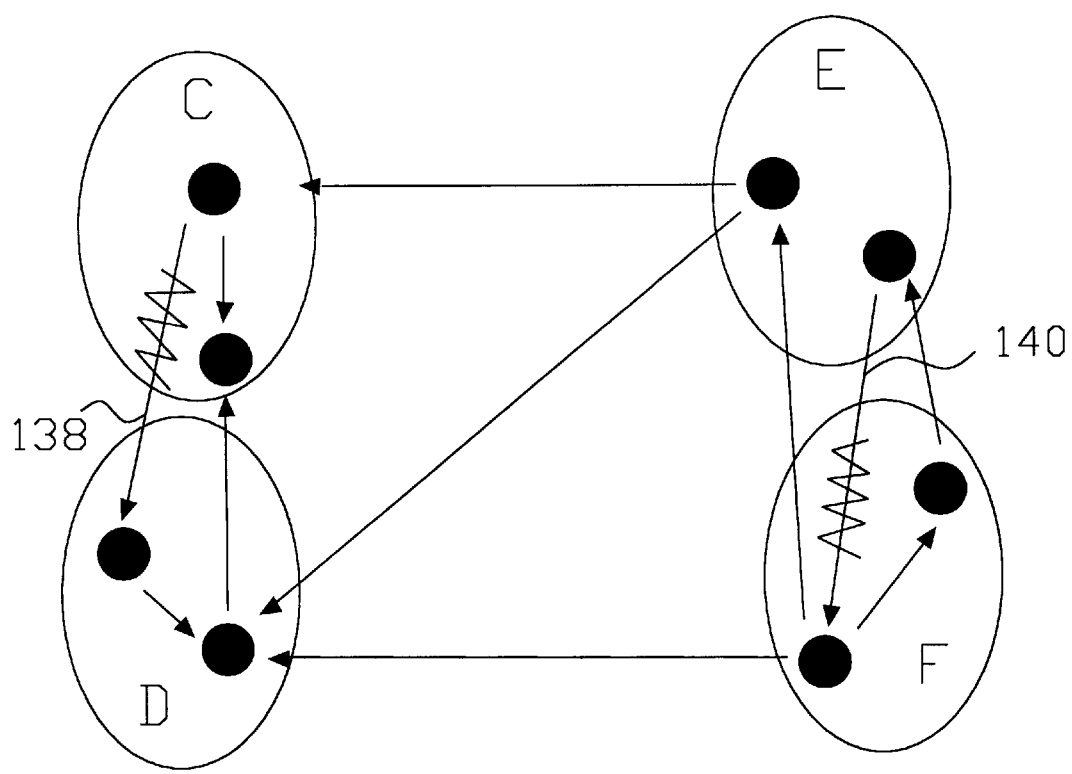
FIG. 6 is a schematic representation of the sets A and B of FIG. 5 partitioned into four sets.

As illustrated in FIG. 6, the partitioning step is recursively applied to sets A and B, thereby forming sets C, D, E and F. Between each pair of sets C/D and E/F, additional arcs 138 and 140 are marked for deletion. As illustrated, one arc 138 from C to D and one arc 140 from E to F have been marked as indicated by hatch marks.

Figure 7:
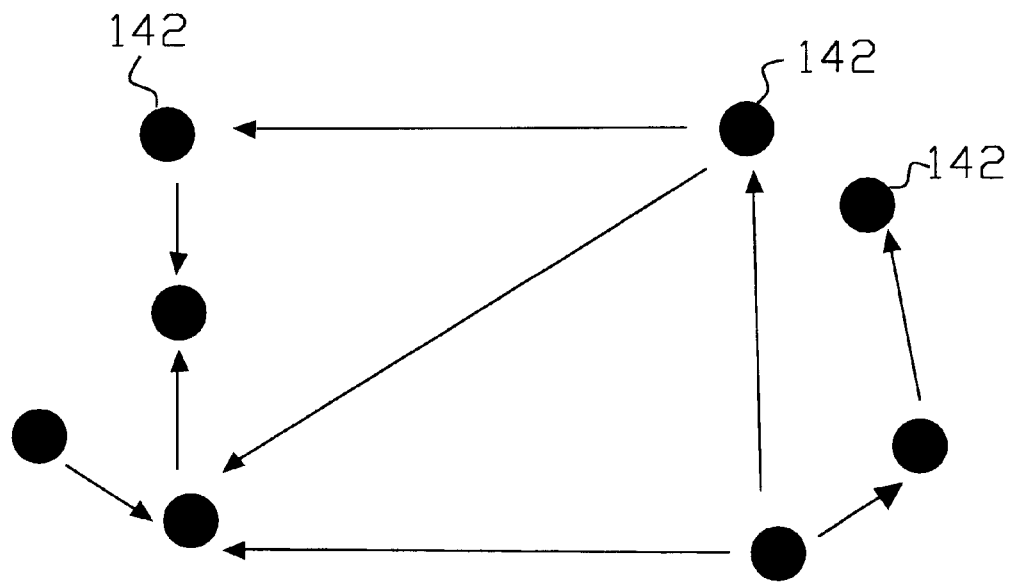
FIG. 7 is a schematic representation of the sets of FIG. 6 with no cycles spanning any of the sets.

Referring now to FIG. 7, sets of vertices C, D, E and F are illustrated with the two arcs 138 and 140, which were marked for deletion in FIG. 6, removed. As illustrated in FIG. 7, an additional partitioning step is not required since a directed path in the resulting graph wherein the beginning point and ending point is the same does not exist. That is, between any two vertices 142, a new partition cannot be made wherein a directed path exists in directly opposing directions. Therefore, the resulting graph is deadlock free and the method has proceeded to the point at which there is no subgraph in the network within which a cycle remains.

Figure 8:
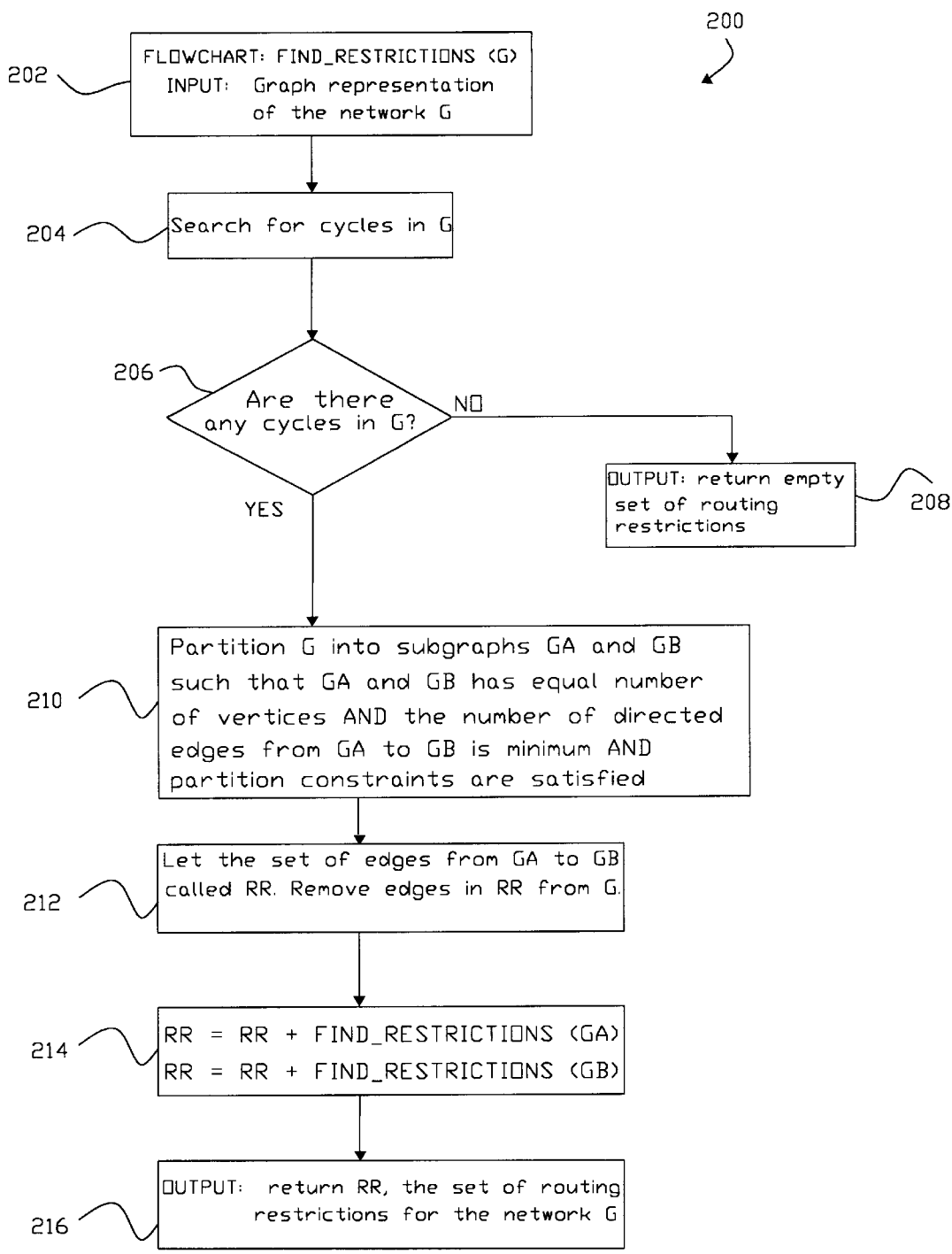
FIG. 8 is a flow chart illustrating the steps of a method for avoiding deadlocks in a computer network according to the present invention.

A computer program directed to a preferred embodiment of the method of avoiding deadlocks in a computer network is set forth below, and will be discussed with reference to the flow chart illustrated in FIG. 8. It is to be appreciated that the method of the present invention and particularly as preferably embodied in the following computer program may be implemented on one or more appropriately programmed general purpose digital computers, each having a processor, associated memory and input/output interfaces for executing the functions thereof.

FIND-RESTRICTIONS (G(V,E))
input: graph representation of the network
output: a set of turn restrictions
Step 1: CYCLE_DETECT(G)
   if no cycles in G then return empty set
   end if
Step 2: Partition V into set of vertices A and B such that
   A and B have a nearly equal number of vertices
   AND the number of arcs from A to B is a minimum
   AND partition constraints are satisfied.
Step 3: Remove the set of arcs TR from A to B
Step 4: TR TR+FIND_RESTRICTIONS($G_A$)
Step 5: TR TR+FIND_RESTRICTIONS($G_B$)
Step 6: return TR The above computer program corresponds with a flow chart 200 illustrated in FIG. 8. Flow chart 200 includes a number of steps designed to determine a set of routing restrictions corresponding to a graphical representation of a network. In a first step 202 in flow chart 200, a graphical representation of a network G is input. To begin the analysis, in step 204, network G is analyzed for the existence of cycles, prior to any partitioning or other manipulation of the network. In step 206 the question is asked whether there are any cycles in network G. If the answer to the question in step 206 is no, then the flowchart outputs a message indicating that an empty set of routing restrictions exists in network G, as indicated in step 208. An indication of no routing restrictions means that no cycles exists and the procedure is terminated.

If the answer to the question in step 206 is yes, indicating that there are cycles in network G, the method will proceed to step 210. In step 210, network G is partitioned into subgraphs GA and GB. In a preferred embodiment of the method, network G is partitioned in a manner such that subgraphs GA and GB have an equal number of vertices, the number of directed edges from subgraph GA to GB is minimized and partition constraints (if any) are satisfied.

After partitioning network G, the set of edges from subgraph GA and subgraph GB are identified as the set RR in step 212. Further, in step 212, edges in the set RR are removed from network G.

In step 214, the entire procedure is repeated for each of sets GA and GB. Each of sets GA and GB are analyzed for the existence of cycles. If cycles exist, they are further partitioned and a new set of routing restrictions RR is identified. The total number of routing restrictions in the original set RR for network G is incremented by the number of routing restrictions found in each of the sets GA and GB.

The last step 216 in flow chart 200 is to return the total amount of routing restrictions identified in the set RR for network G.

Figure 9:
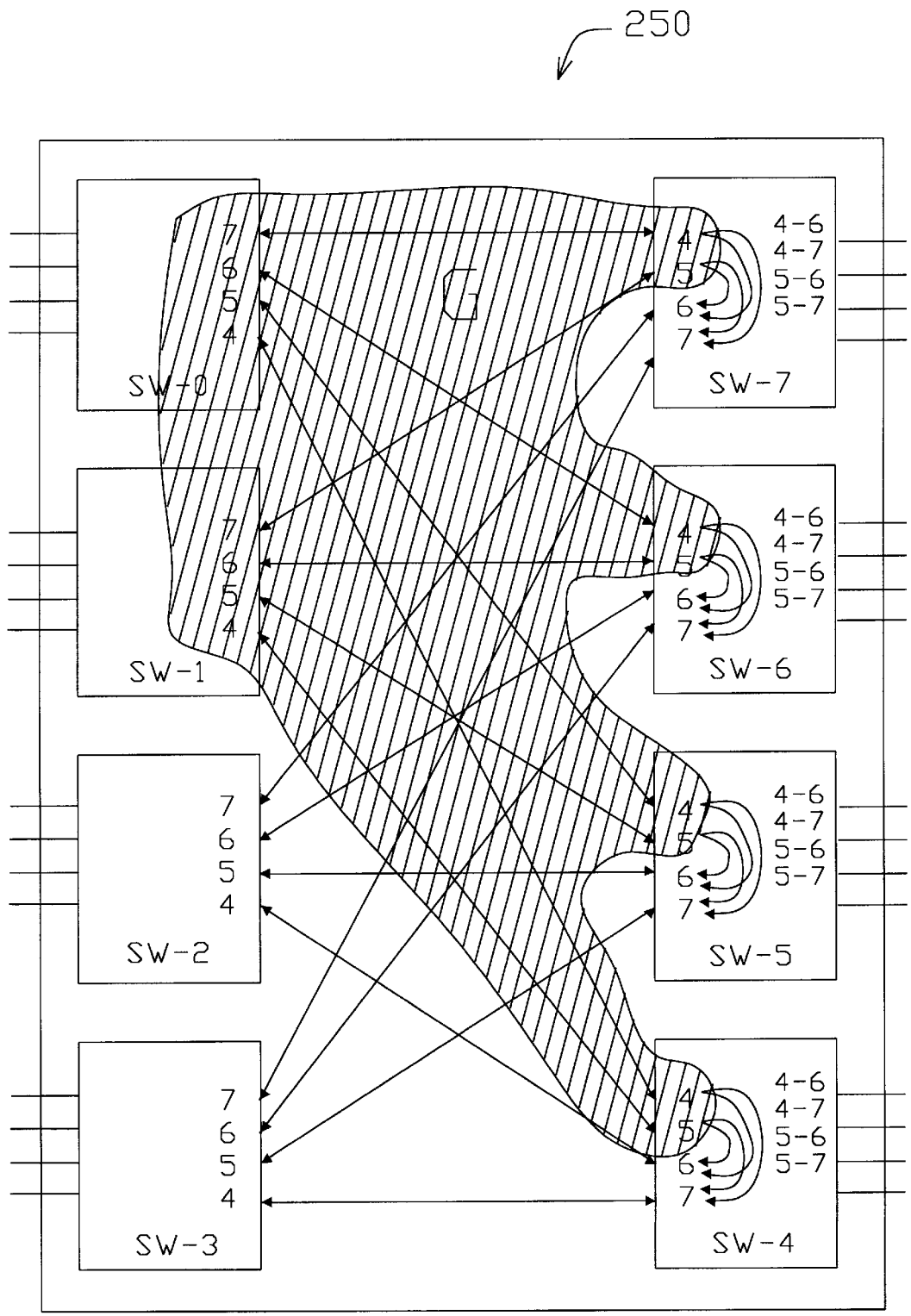
FIG. 9 is a schematic representation illustrating a first partition in a switch board.
Figure 10:
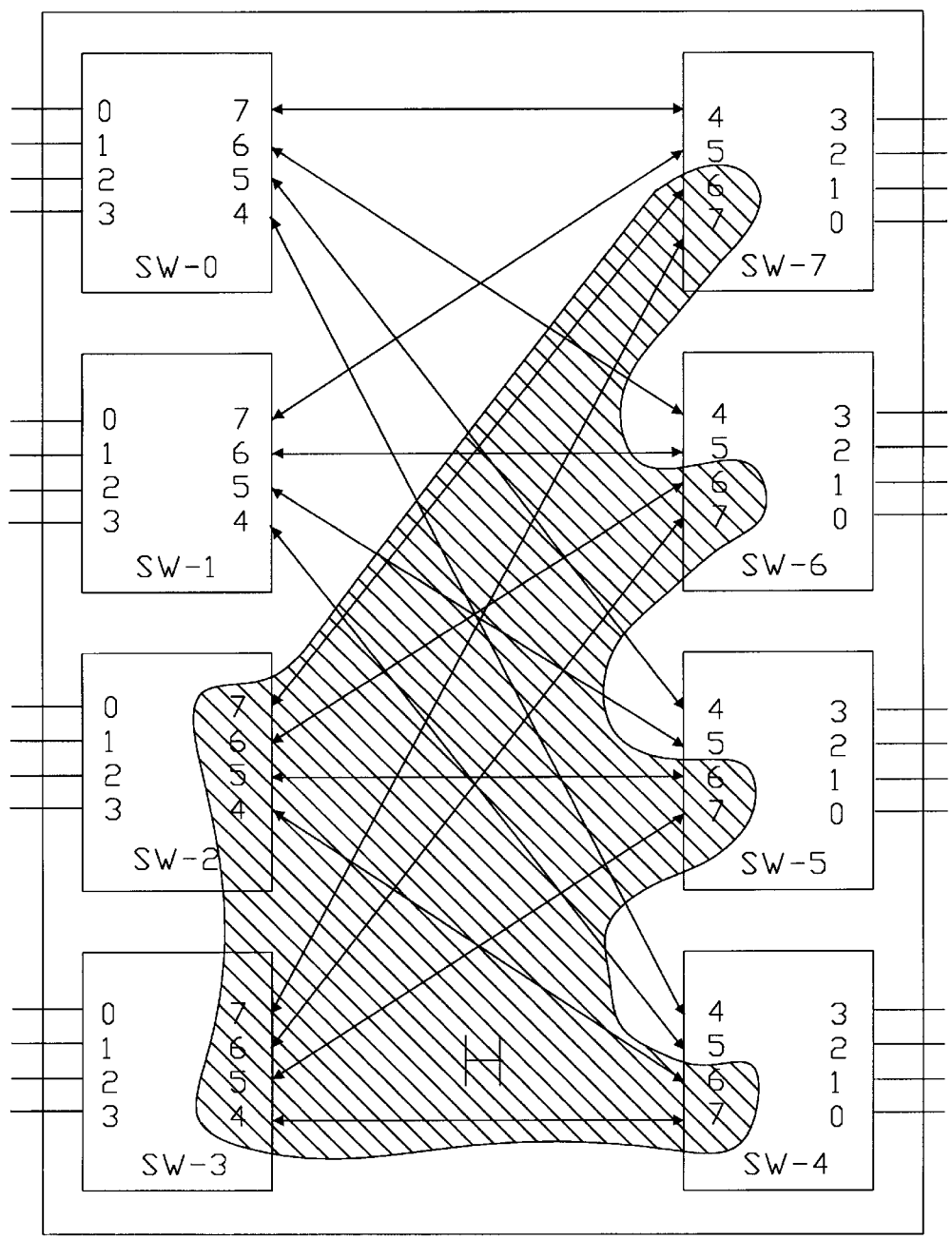
FIG. 10 is a schematic representation illustrating a second partition in a switch board.

With reference to FIGS. 9 and 10, the method in accordance with the present invention will now be applied to and illustrated with respect to an SP switch board 250. The switch board 250 is first checked to determine the existence of cycles. If there are no cycles detected, the procedure will provide an output indicating that no cycles exist and no further analysis will be necessary. If cycles do exist, the switch board is partitioned into two subgraphs G and H which are illustrated as shaded areas in FIGS. 9 and 10, respectively. The arcs from the subgraph G illustrated in FIG. 9 to the subgraph H illustrated in FIG. 10 are removed. The arcs which are removed are indicated as arrows in FIG. 9. Thus, the first partition of switch board 250 results in sixteen (16) turn restrictions distributed across switch chips 4, 5, 6 and 7 (i.e., ports 4-6, 4-7, 5-6 and 5-7 on each of the four switch chips).

Figure 11:
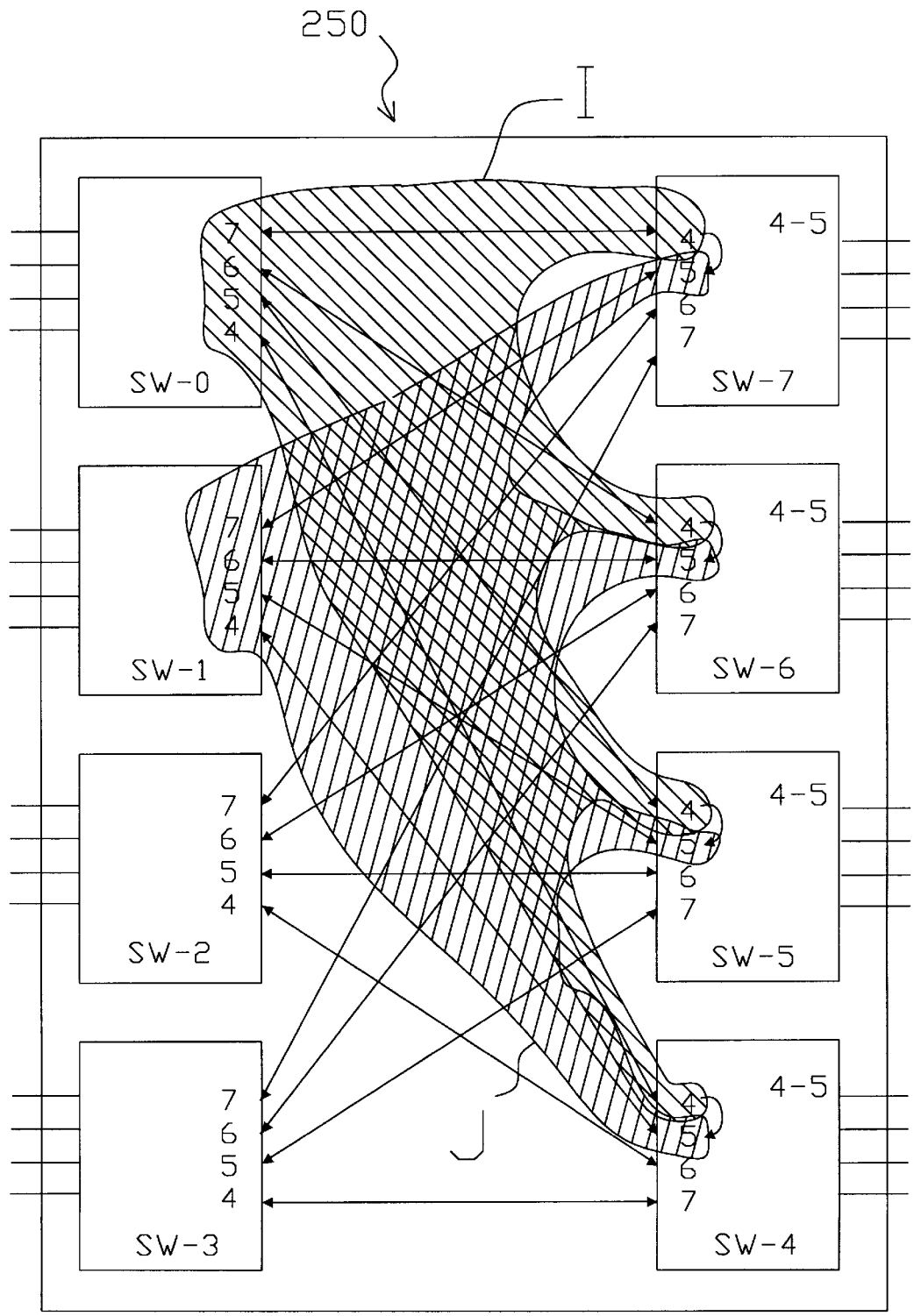
FIG. 11 is a schematic representation illustrating further partitioning of the first partition of the switch board of FIG. 9.
Figure 12:
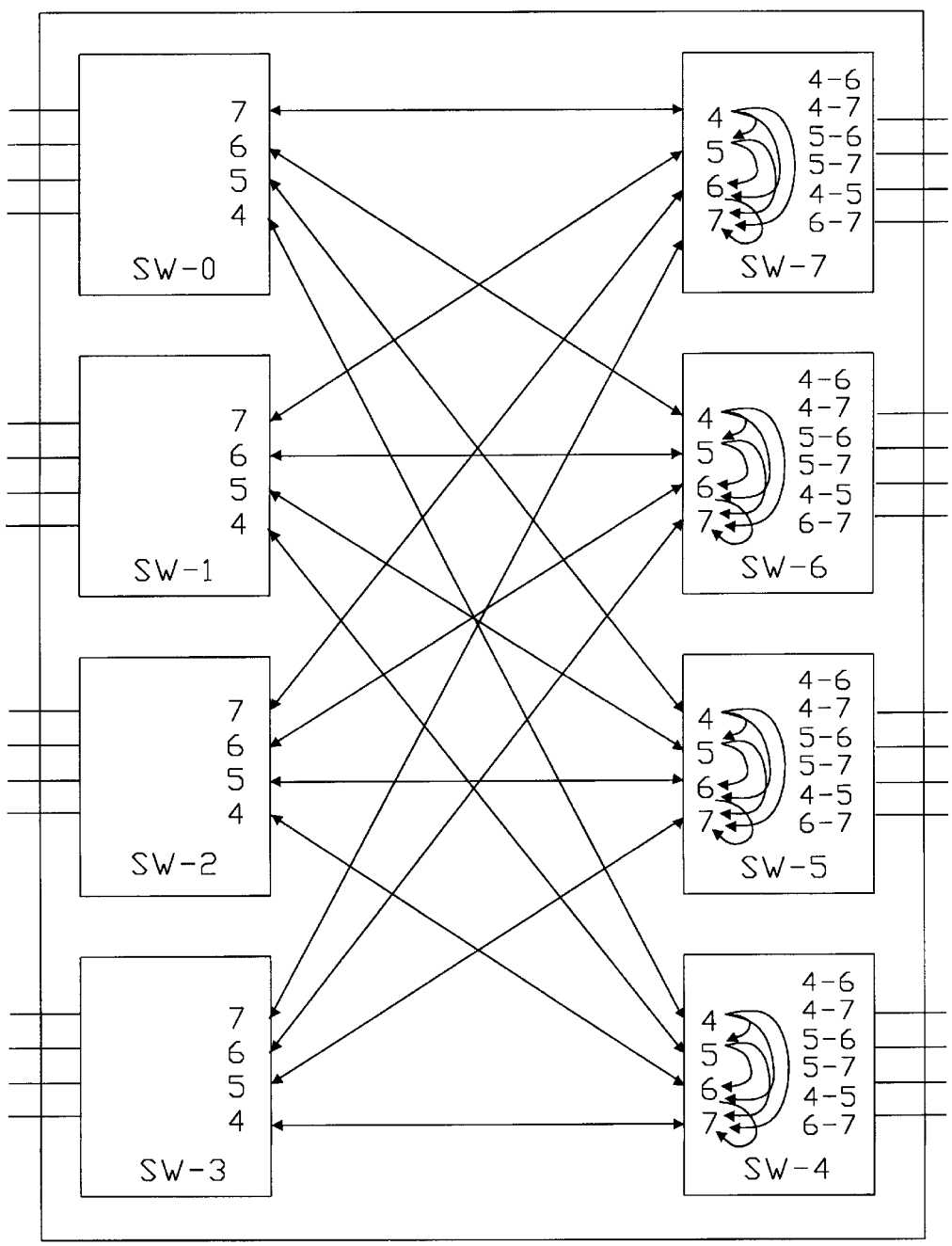
FIG. 12 is a schematic representation of a switch board illustrating the routing restrictions identified in accordance with the method of the present invention.

The first of the two subgraphs, subgraph G, is then partitioned into two sub-subgraphs I and J as illustrated by the two shaded areas in FIG. 11. The arc from port 4 to port 5 in each of switch chips 4, 5, 6 and 7 is identified and removed as indicated by the arrows. Likewise, the second subgraph H is partitioned into two sub-subgraphs and the arcs from port 6 to port 7 are removed in each of switch chips 4, 5, 6 and 7. With no cycles remaining in switch board 250, the method results in a total of twenty-four (24) turn restrictions as illustrated in FIG. 12.

The turn restrictions resulting from the method according to the present invention as discussed above are tabulated below:

| | |
|---|---|
| Switch 0 | |
| Switch 1 | |
| Switch 2 | |
| Switch 3 | |
| Switch 4 | 4–5 4–6 4–7 5–6 5–7 6–7 |
| Switch 5 | 4–5 4–6 4–7 5–6 5–7 6–7 |
| Switch 6 | 4–5 4–6 4–7 5–6 5–7 6–7 |
| Switch 7 | 4–5 4–6 4–7 5–6 5–7 6–7 |

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. For example, the embodiments of the method in accordance with the present invention described above included the steps of partitioning the network without any partitioning constraints. In some networks, it may be necessary to employ partitioning constraints in order to satisfy topological and architectural requirements. For example, as shown in FIG. 12, every possible turn from ports 4, 5 and 6 to port 7 is restricted on switches 4, 5, 6 and 7. Since the only way to communicate a message from any one of the switches 4, 5, 6 and 7 is to proceed through port 7, switches 0, 1 and 2 are unable to communicate a message to switch 3. Constraints may be used in the partitioning step of the method to solve this and other similar problems. For example, some arcs may be marked as "cannot be removed", and therefore these arcs will not exist between the sets A and B. There are a plethora of constraints which may be incorporated. The constraints depend on the topology, architecture, and performance requirements of the network. The method of the present invention does not depend on a particular constraint, rather it may incorporate any number of constraints or none at all. All such changes and modifications are intended to be included within the scope of the invention as defined by the appended claims.

What is claimed is:

1. A method for preventing routing deadlocks from occurring in a network including successive stages of cross-point switches which collectively interconnect a plurality of nodes external to said network, comprising the steps of:

creating a graphical representation of the network;

searching for the existence of cycles within the graphical representation;

partitioning the graphical representation into a first subgraph and a second subgraph if cycles exit in the graphical representation;

searching for the existence of edges directed from the first subgraph to the second subgraph; and removing the edges directed from the first subgraph to the second subgraph.

2. The method for preventing routing deadlocks from occurring in a network as recited in claim 1, further comprising the step of:

counting the number of edges found during the step of searching for the existence of edges directed from the first subgraph to the second subgraph.

3. The method for preventing routing deadlocks from occurring in a network as recited in claim 2, further comprising the step of:

outputting the number of edges found during the step of searching for the existence of edges directed from the first subgraph to the second subgraph.

4. The method for preventing routing deadlocks from occurring in a network as recited in claim 1, further comprising the steps of:

partitioning the first subgraph into a first sub-subgraph and a second sub-subgraph;

partitioning the second subgraph into a third sub-subgraph and a fourth sub-subgraph;

searching for the existence of edges directed from the first sub-subgraph to the second sub-subgraph and from the third sub-subgraph to the fourth sub-subgraph; and removing the edges directed from the first sub-subgraph to the second sub-subgraph and the edges directed from the third sub-subgraph to the fourth sub-subgraph.

5. The method for preventing routing deadlocks from occurring in a network as recited in claim 4, further comprising the step of:

counting the number of edges found during the step of searching for the existence of edges directed from the first sub-subgraph to the second sub-subgraph and from the third sub-subgraph to the fourth sub-subgraph.

6. The method for preventing routing deadlocks from occurring in a network as recited in claim 5, further comprising the step of:

outputting the number of edges found during the step of searching for the existence of edges directed from the first sub-subgraph to the second sub-subgraph and from the third sub-subgraph to the fourth sub-subgraph.

7. The method for preventing routing deadlocks from occurring in a network as recited in claim 1, further comprising the step of:

repeating the partitioning, searching, and removing steps until no cycles exist in the network.

8. The method for preventing routing deadlocks from occurring in a network as recited in claim 1, wherein the step of partitioning the graphical representation into at a first subgraph and a second subgraph is performed such that the first subgraph and the second subgraph have an equal number of vertices.

9. The method for preventing routing deadlocks from occurring in a network as recited in claim 1, wherein the step of partitioning the graphical representation into at a first subgraph and a second subgraph is performed such that a number of directed edges from the first subgraph to the second subgraph is minimized.

10. The method for preventing routing deadlocks from occurring in a network as recited in claim 1, further comprising the step of imposing a set of partition constraints prior to the partitioning step.

11. The method for preventing routing deadlocks from occurring in a network as recited in claim 10, wherein the step of partitioning the graphical representation into at a first subgraph and a second subgraph is performed such that the set of partition constraints are satisfied.

12. A method for preventing routing deadlocks from occurring in a network including successive stages of cross-point switches which collectively interconnect a plurality of nodes external to said network, comprising the steps of:

searching for the existence of cycles within the network;

partitioning the network into at a first subgraph and a second subgraph if cycles exist in the network;

searching for the existence of edges directed from the first subgraph to the second subgraph; and removing the edges directed from the first subgraph to the second subgraph.

13. The method for preventing routing deadlocks from occurring in a network as recited in claim 12, further comprising the step of:

counting the number of edges found during the step of searching for the existence of edges directed from the first subgraph to the second subgraph.

14. The method for preventing routing deadlocks from occurring in a network as recited in claim 13, further comprising the step of:

outputting the number of edges found during the step of searching for the existence of edges directed from the first subgraph to the second subgraph.

15. The method for preventing routing deadlocks from occurring in a network as recited in claim 12, further comprising the steps of:

partitioning the first subgraph into a first sub-subgraph and a second sub-subgraph;

partitioning the second subgraph into a third sub-subgraph and a fourth sub-subgraph;

searching for the existence of edges directed from the first sub-subgraph to the second sub-subgraph and from the third sub-subgraph to the fourth sub-subgraph; and removing the edges directed from the first sub-subgraph to the second sub-subgraph and the edges directed from the third sub-subgraph to the fourth sub-subgraph.

16. The method for preventing routing deadlocks from occurring in a network as recited in claim 15, further comprising the step of:

counting the number of edges found during the step of searching for the existence of edges directed from the first subgraph to the second subgraph.

17. The method for preventing routing deadlocks from occurring in a network as recited in claim 16, further comprising the step of:

outputting the number of edges found during the step of searching for the existence of edges directed from the first subgraph to the second subgraph.

18. The method for preventing routing deadlocks from occurring in a network as recited in claim 12, further comprising the step of:

repeating the partitioning, searching, and removing steps until no cycles exist in the network.

19. The method for preventing routing deadlocks from occurring in a network as recited in claim 12, wherein the step of partitioning the network into at a first subgraph and a second subgraph is performed such that the first subgraph and the second subgraph have an equal number of vertices.

20. The method for preventing routing deadlocks from occurring in a network as recited in claim 12, wherein the step of partitioning the network into at a first subgraph and a second subgraph is performed such that a number of directed edges from the first subgraph to the second subgraph is minimized.

21. The method for preventing routing deadlocks from occurring in a network as recited in claim 12, further comprising the step of imposing a set of partition constraints prior to the partitioning step.

22. The method for preventing routing deadlocks from occurring in a network as recited in claim 21, wherein the step of partitioning the network into at a first subgraph and a second subgraph is performed such that the set of partition constraints are satisfied.

23. The method for preventing routing deadlocks from occurring in a network as recited in claim 12, wherein said network comprises 512 separate processing elements and sais switches are organized into about 32-port switch boards and said network further comprises a plurality of said switch boards wherein 32 of said switch boards are node switch boards and 16 of said switch boards are intermediate switch boards, with said intermediate switch boards collectively inter-connecting all of said node switch boards such that a corresponding one of 16 ports on each of said node switch boards is connected, through a different corresponding link, to the same corresponding port on each one of said node switch boards and the remaining 16 ports on each of the node switch boards are connected to 16 different successive ones of said processing elements.

* * * * *